United States Patent
Lumley et al.

(10) Patent No.: US 9,256,591 B2
(45) Date of Patent: Feb. 9, 2016

(54) DOCUMENT HANDLING METHOD

(75) Inventors: John William Lumley, Bristol (GB);
Al-Fathiatul Habibah Abdul Rahman, Bristol (GB)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1817 days.

(21) Appl. No.: 12/508,657

(22) Filed: Jul. 24, 2009

(65) Prior Publication Data
US 2011/0022944 A1    Jan. 27, 2011

(51) Int. Cl.
*G06F 17/24* (2006.01)
(52) U.S. Cl.
CPC ................. *G06F 17/248* (2013.01)
(58) Field of Classification Search
CPC ....................................... G06F 17/248
USPC ................... 715/234, 243, 254, 255
See application file for complete search history.

(56) References Cited

U.S. PATENT DOCUMENTS

| | | | |
|---|---|---|---|
| 5,956,736 A | 9/1999 | Hanson et al. | |
| 6,108,661 A | 8/2000 | Caron et al. | |
| 6,336,124 B1 * | 1/2002 | Alam et al. | 715/205 |
| 7,089,560 B1 | 8/2006 | Uhler et al. | |
| 7,281,018 B1 | 10/2007 | Begun et al. | |
| 2004/0034830 A1 * | 2/2004 | Fuchs et al. | 715/501.1 |
| 2004/0168124 A1 | 8/2004 | Beisiegel et al. | |
| 2007/0041035 A1 | 2/2007 | Sembower et al. | |
| 2008/0028302 A1 | 1/2008 | Meschkat | |

* cited by examiner

*Primary Examiner* — Kyle Stork
(74) *Attorney, Agent, or Firm* — Hewlett-Packard Patent Department (57) ABSTRACT

If a top-level document refers to a second document as a template, a first method specified by said top-level document is executed to yield a presentation that is used as an argument for a second method specified by the second document. If the top-level document does not refer to another document as a template, the first method is executed to yield a final presentation.

16 Claims, 9 Drawing Sheets

```
<doc title="sample1">
  <variable name="v1" update="input">1234</variable>
  <presentation>
    <p>Introductory paragraph in document <xsl:value-of
    select="@title"/>
    </p>
    <ol>
      <li>Some list item</li>
      <li>Item with v1=<val select="v1"/>
      </li>
    </ol>
  </presentation>
  <update>
    <template match="presentation//li[last()]"
    guard="$event[@name='addList']">
      <copy-of select="."/>
      <li>New list item</li>
    </template>
  </update>
</doc>
```

```
<doc title="Template1">
  <metadata>
    <showVars/>
  </metadata>
  <presentation>
    <style> p { font-weight: bold; } </style>
    <table frame="box">
      <tr>
        <td style="background-color:pink">
          <p>Content<br/>added<br/>from<br/>
            <xsl:value-of select="@title"/>
          </p>
        </td>
        <td>
          <TEM:apply-templates select="//presentation/*"/>
          <xsl:if test="//metaData/showVars">
            <TEM:apply-templates select="//variable"/>
          </xsl:if>
        </td>
      </tr>
    </table>
    <TEM:template match="val">
      <TEM:value-of select="$originalDocument//
      variable[@name=current()/@select]"/>
    </TEM:template>
    <TEM:template match="ol">
      <ol type="A">
        <TEM:apply-templates select="*"/>
      </ol>
    </TEM:template>
    <TEM:template match="variable[@update]">
      <form>... <input type="text">...</input>
      </form>
    </TEM:template>
  </presentation>
  <update>...</update>
</doc>
```

```
<doc title="Template1">
  <presentation>...</ presentation>
  <update>
   <template match="variable[$param[@name eq
   current()/@name]]">
    <copy>
      <sequence select="@*"/>
      <value-of select="$param[@name eq
      current()/@name]/value"/>
    </copy>
   </template>
  </update>
</doc>
```

FIG. 9

DOCUMENT HANDLING METHOD

BACKGROUND

Herein, related art is described for expository purposes. Related art labeled "prior art", if any, is admitted prior art; related art not labeled "prior art" is not admitted prior art.

Templates and cascading style sheets are technologies for providing a common look and feel across a group of electronic documents, e.g., in the form of HTML and XML files. The resulting commonality can be used for branding purposes, e.g., so that all documents from a company are presented with its logo. Also, the commonality can be used to ensure that certain required elements are present in all documents within a group, e.g., a link to a company home page or company retail store.

DETAILED DESCRIPTION

Figure 1:
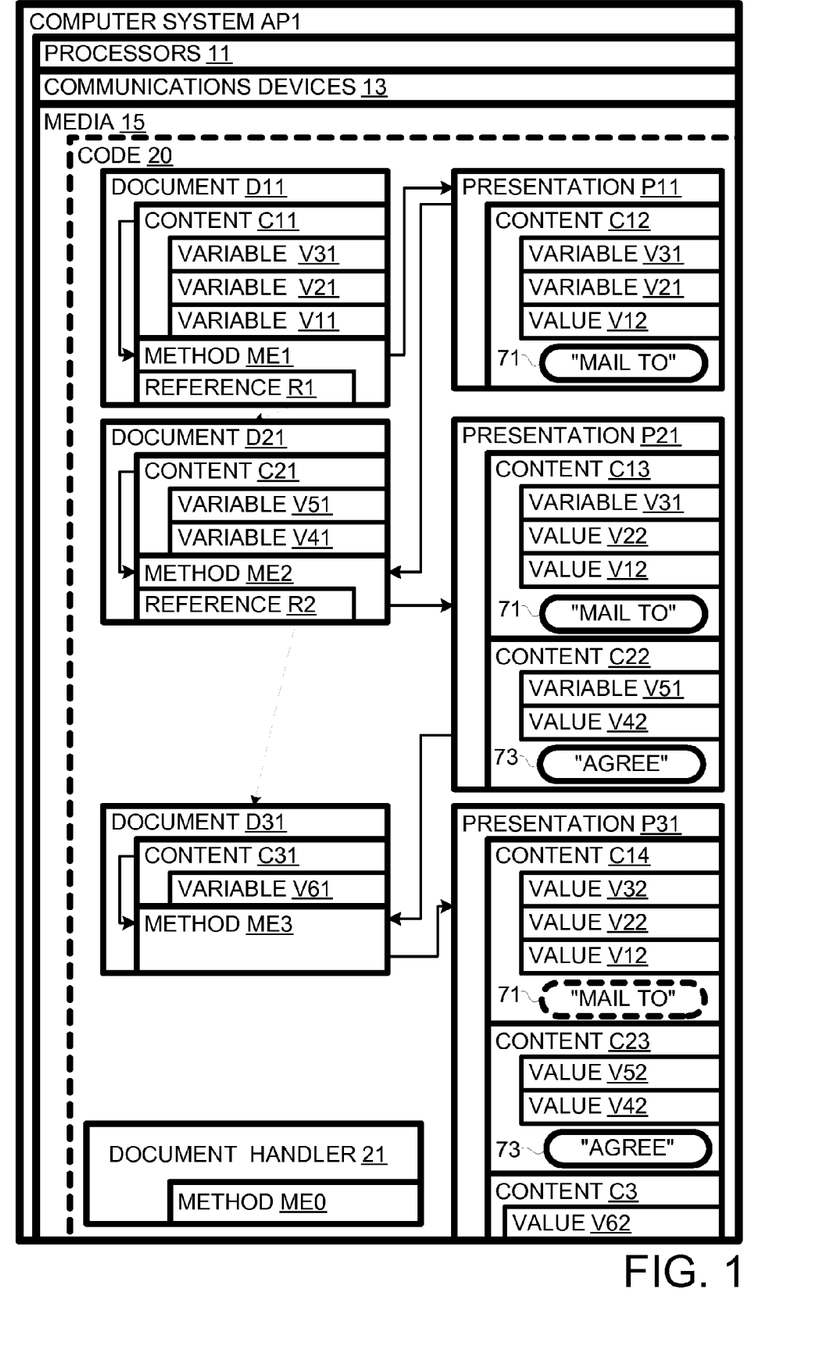
FIG. 1 is a schematic diagram of a computer system for handling documents.

A system AP1, shown in FIG. 1, provides for dynamic templates that include methods; a template's method can accept top-level documents or intermediate-level templates as arguments to provide for dynamic updating of the common elements of a set of presentations. The methods can allow operations that would be difficult to achieve using static template and cascading style sheet approaches; for example, a dynamic template can be designed and applied to existing top-level documents so as to add an "agree to terms and conditions" button to each "send email" button in each top-level document. Moreover, because the methods are built into the documents themselves, the number of files that must be managed when updating templates and top-level documents is minimized.

As shown in FIG. 1, system AP1 includes processor 11, communications (input/output and networking) devices 13, and computer-readable storage media 15. Media 15 is encoded with code 20 so as to define a document handler 21, documents D11, D21, and D31, and respective presentations P11, P21, and P31. More generally, the number of documents and presentations can vary within system AP1.

Document D11 can be in the form of an XML file. Document D11 is a top-level document in that it is the one for which a presentation is desired. While there may be another document that refers to document D11 as a master template, that document is not the one selected for presentation in this particular case. In general, the top-level document has the most specific content of those documents involved in generating a final presentation for the top-level document. Document D11 includes content C11 and a method ME1. Note a document can include zero, one, or more methods; however, plural methods can be characterized as a single method with conditionally executed branches, so "including a method" is equivalent to "including one or more methods". Content C11 can include presentation elements, such as links, buttons, text, and graphics, as well as variables, e.g., V11, V21, and V31 to be replaced by such presentation elements in a final presentation.

Method ME1 can be in the form of XSLT (Extensible Stylesheet Language Transformations, used to transform XML documents into other XML or human readable documents) declarations. Method ME1 can include a range of submethods. These can include a reference R1 to document D21 as a master template. Method ME1 can also specify other pointers, e.g., to other top-level documents from which excerpts (e.g., boiler plate) are to be imported. References can also be made to tables or other databases to obtain values for specified parameters. For example, value V12 (of presentation P11) for variable V11 may be obtained from an off-document source specified by method ME1.

Execution of method ME1 produces presentation P11, e.g., a page that can be displayed. Presentation P11 includes content C12, which is derived, at least in part, from content C11 by method ME1. Method ME1 provides for evaluation of variable V11, resulting in value V12 in presentation P11. However, method ME1 does not evaluate variables V21 and V31, which remain as variables in presentation P11. In view of reference R1 to master template document D21, presentation P11 is an intermediate presentation that is not displayed, but that is used as an input to a method of the referenced template, in this case, method ME2 of template document D21.

Document D21, which can be an XML file, includes content C21 and method ME2, in the form of XLST declarations. Document D21 includes content 21, specifying variables V41 and V51, and method ME2, which includes a reference R2 to document D31 as a master template. As a template method itself, method ME2 accepts an argument, e.g., presentation P11, of a document, e.g., document D1, referring to its document D21 as a master template.

As the phrase "master template" implies, system AP1 provides for non-master templates with procedures that are subsumed by those of the corresponding master template. For example, document D11 can include references to subordinate templates; in that case, method ME2, when executed, incorporates and coordinates their respective methods. Hereinafter, "template" means "master template" unless otherwise indicated explicitly or by context.

Execution of method ME2 results in presentation P21, which includes content C13, derived from content C12, and content C22, derived from content C21. Depending on the specific declarations of method ME2, contents C13 and C22 can be separate or intermixed. Method ME2 provides for evaluation of variables V21 and V41, yielding values V22 and V42. Variables V31 and V51 remain unevaluated in presentation P21.

In view of reference R2 to document D31, presentation P21 becomes an argument for method ME3 of template document D31. Template document D31 (which is also an XML document) is a "root" template in that its method ME3 does not reference another document as a template. Document D31 also includes content C31, which specifies a variable V61.

When executed, method ME3 generates presentation P31. Since method ME3 does not reference another document as a template, presentation P31 is final, so it, unlike intermediate presentations P11 and P21, is to be displayed, e.g., to a human user. Method ME3 evaluates variables V31, V51, and V61, so that presentation P31 includes values for all variables V11-V61 presented as contents in documents D11, D21, and D31. If another document D12 refers to D21 as template then it would generate a different presentation, albeit probably with similar styling and some common elements.

Figure 2:
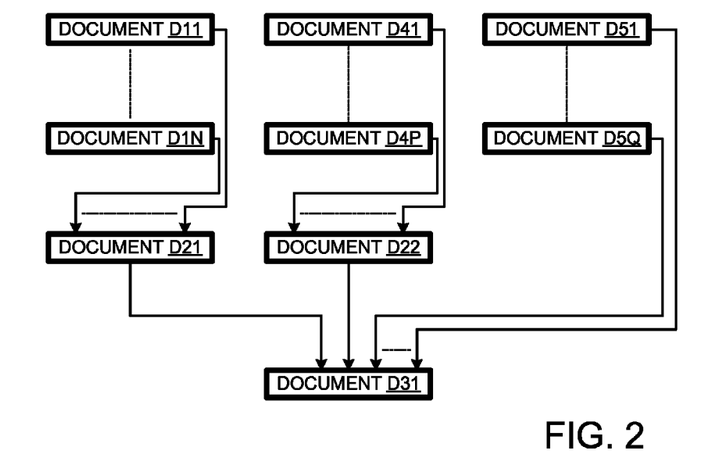
FIG. 2 is a hierarchical representation of top-level and template documents of the system of FIG. 1.

Template documents D21 and D31 apply to top-level documents other than D11. For example, as shown in FIG. 2, top-level documents D11-D1N refer to document D21 as a template. Thus, template document D21 provides for commonality among the final presentations resulting from top-level documents D11-D1N. Likewise, top-level documents D41-D4P refer to an alternative intermediate template D22, which provides for common elements in the final presentations corresponding to documents D41-D4P. Intermediate templates D21 and D22 both refer to root template document D31, which provides for commonality among top-level documents D11-D1N, D41-D4P, and D51-D5Q. Note that documents D51-D5Q refer directly to root template document D31 rather than to an intermediate template such as document D21.

In system AP1, each document refers to at most one other document as a master template. A template document that refers to another document as a master template is an "intermediate" template. A template document that does not refer to another document template is a "root" template. Execution of a method of an intermediate template or a top-level document referring to a document as a template results in an intermediate presentation that is typically not displayed. Execution of the method of a root template or a top-level document that does not refer to another document as a template results in a final presentation that is typically displayed. In system AP1, each document that refers to another document as a template refers to exactly one master template. In alternative embodiments, a document can refer to more than one other document as a master template.

Figure 3:
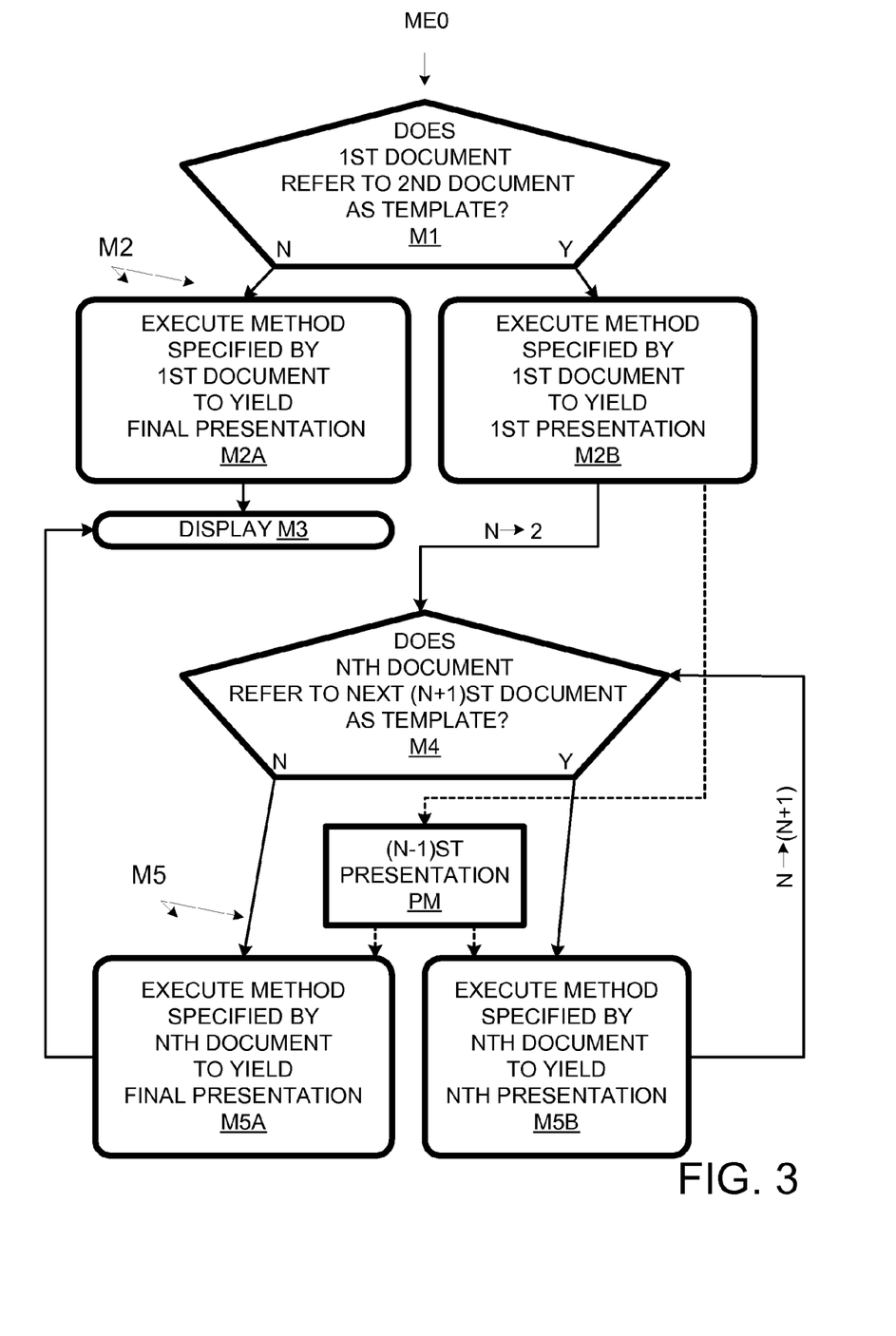
FIG. 3 is a flow chart of a method implemented in the context of the system of FIG. 1.

Execution of methods ME1-ME3 is directed by document handler 21, which basically interprets XML descriptions and XSLT declarations in accordance with a method ME0, flow charted in FIG. 3. More specifically, document handler 21 generates an executable program from each template method; the executable for each master template also incorporates the methods of any subordinate templates. In generating an executable program from a template method, document handler 21 can take into account the status of a user making a request for a document, the nature of the request, and the content of the document. For example, access controller 31 can allow some users to modify a presentation while providing others with read-only access.

At method segment M1, a determination is made whether or not a first top-level document refers to a second document as a template. What happens at method segment M2 depends on the outcome of method segment M1. If the top-level document does not refer to another document as a template, at method subsegment M3A, the method of the top-level document (e.g., method ME1 of document D11) is executed to yield a final presentation that is displayed at method segment M3; method ME0 terminates at this point. If, on the other hand, the top-level document refers to another document as a template, at method subsegment M2B, the method (e.g., ME1) of the top-level document is executed to yield an intermediate presentation PM that is not displayed (unless in some debugging mode). The first time through method ME0, presentation PM corresponds to presentation P11 of FIG. 1. After method subsegment M2B, method ME0 proceeds to method segment M4

As method ME0 provides for recursive operation, this description provides an iteration index N that corresponds to the depth of a template (relative to a top-level of N=1) of the current document and method being considered. For example, after execution of the top-level document method, N is incremented from "1" to "2". However, rather than tracking this index explicitly, method ME0 just continues iterating until it executes a method of a document that does not refer to another document as a template.

Method segment M4 determines whether the second (Nth) document (a template) refers to a third ((N+1)st) document as a template. What happens at method segment M5 depends on the outcome of method segment M4. If, at method segment M4, it is determined that the second document does not refer to a third document as a template, a method of the second document is executed to yield a final presentation for display at method subsegment M5A, which terminates method ME0. If, at method segment M6, it is determined that the second document refers to a third document as a template, the method of the second document is executed to yield at method subsegment M5B an intermediate presentation (e.g., presentation P21 of FIG. 1) that is not displayed.

After method segment M5B, method ME0 returns to method segment M4. For expository purposes, this return can involve incrementing N. In the example of FIG. 1, the third document would be D31, which does not refer to another (e.g., a fourth) document as a template. Thus, in this iteration, a final presentation would be generated at method subsegment M5A, terminating method ME0. As system AP1 provides for more template levels; in such cases, method segments M4-M5 are iterated until a final presentation is generated and displayed at method segment M3.

Figure 4:
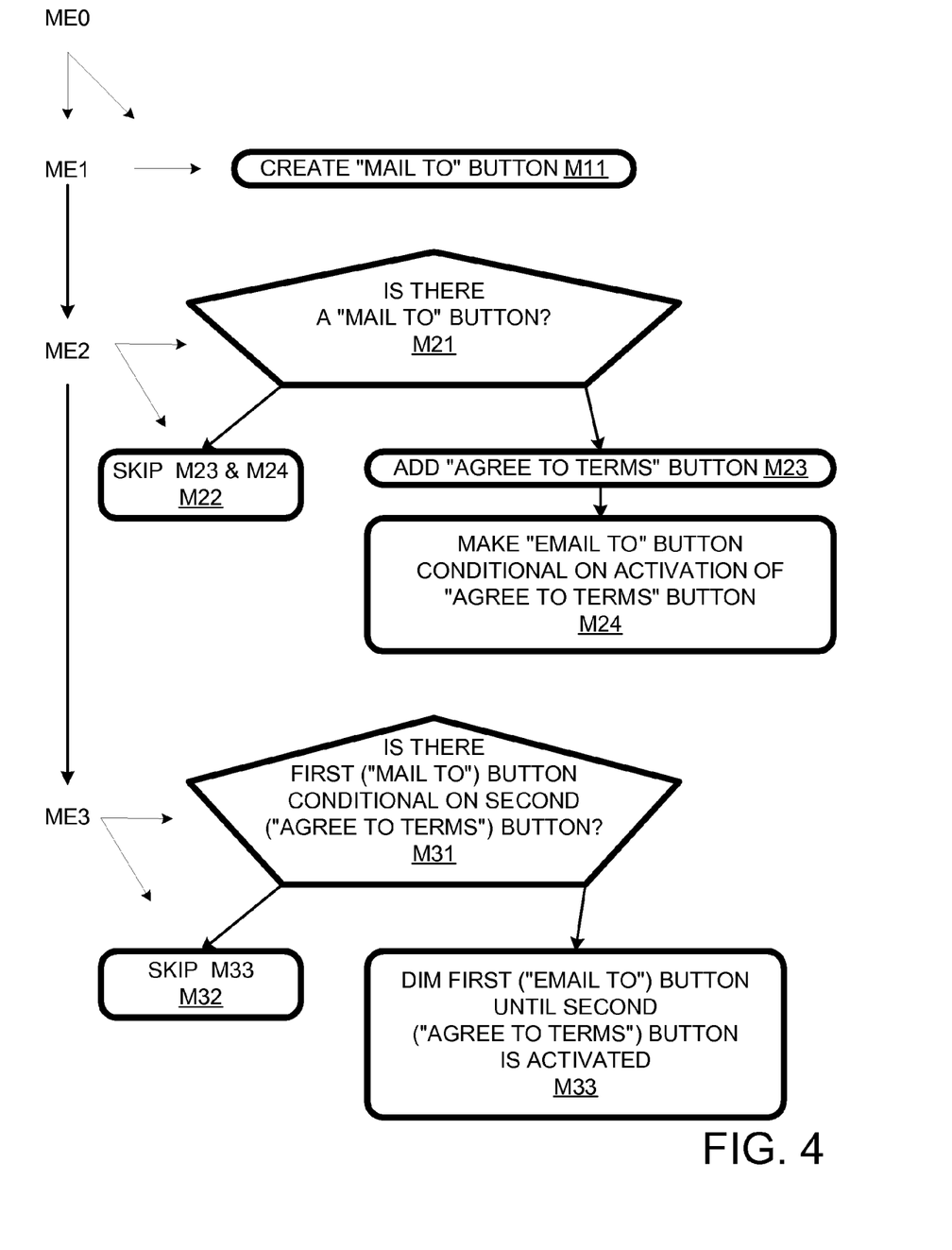
FIG. 4 is a flow chart of a particular instance of the method of FIG. 3.

A particular instance of method ME0 is flow charted in FIG. 4. Method ME1 is executed first. At a method segment M11 of method ME1, a "mail to" button is created so that it is included in a first intermediate presentation (e.g., P11 of FIG. 1).

After method ME1 is completed, method ME0 executes method ME2. Method ME2 includes a method segment M21 that determines whether or not the intermediate presentation resulting from execution of method ME1 includes a "mail to" button. If it did not, method segment M22 would call for skipping method segments M23 and M24. However, in the illustrated case, the first intermediate document includes a "mail to" button. Thus, at method segment M23, an "agree to terms" button is included in the second intermediate presentation (e.g., P21 of FIG. 1). At method segment M24, the "mail to" button is made conditional on activation of the "agree to terms" button. Since method ME2 is applied to all documents referring to the incorporating document as a template, all referring documents including a "mail to" button also include an "agree to terms" button.

Once method ME2 is completed, method ME0 proceeds to method ME3. At method segment M31, a determination is made whether or not a presentation document presented as an argument to method ME3 includes a first button conditional on a second button. If not, method segment M32 calls for skipping method segment M33. If there is a button conditioned on another button, it is dimmed (represented as a dashed outline for "mail to" button 71 as displayed as part of final presentation P31 in FIG. 1). In the present case, the "mail to" button is conditional, so it is dimmed as presented in presentation P31.

Figure 5:
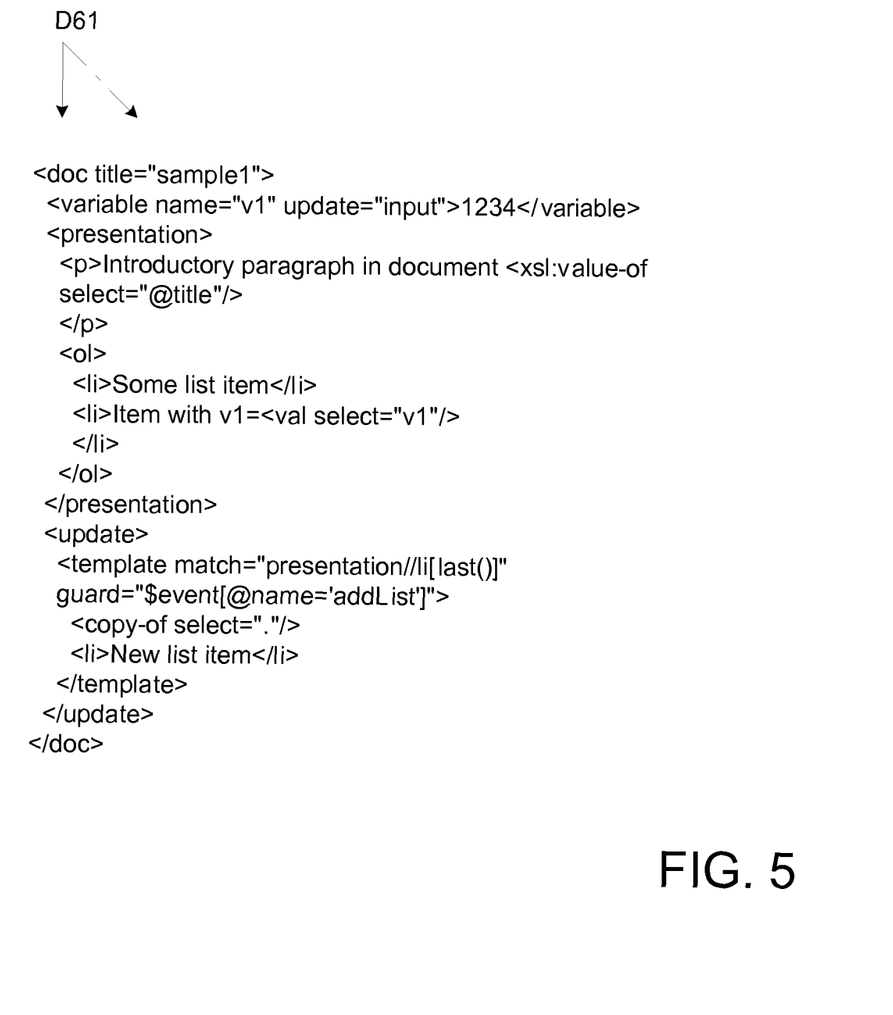
FIG. 5 represents a sample top-level document of the system of FIG. 1.

A relatively simple top-level document D61 is represented in FIG. 5. Document D61 contains a simple variable (with some properties), a description of a (mostly HTML) presentation and a partial program to update the document in response to some declared event, in this case addList. Document D61 is defined by a single self-contained XML tree; all the 'state' of a specific instance of such a document is contained within that tree, as well as all necessary declarations about the document's behavior. Thus a document that had been bound to some variability (e.g. a specific customer) contains somewhere within it all necessary information for that customer.

Document handler 21 design supports "presenting" and "updating" on a top-level document. Presenting involves generating a view of the document that may involve a requested format or channel characteristics and other parameters such as the role or permissions of the viewer. The document contains declarations about how to respond to such requests: alternate presentations for different roles, interactive elements that could trigger changes of state, projections of other parts of the document's state and simple arrangements of layout.

Updating involves responding to external events so as to cause a document to update its state in response. Documents are expected to contain declarations on how (and whether) to modify themselves as a result of such an event. For example an event/request might be 'change variable v1's value to 1001'. The expectation is that of a closed object model—the document contains information about variable v1 (if it exists) and may decide to honor the change request. If the variable is described as read-only then the request will presumably be denied (as indicated somewhere around the variable inside the document); if it is rewritable, then the value element will be rewritten (and other consequences propagated); if it is single assignment, then the assignment type indication for that variable will be altered to read-only after the update.

Figure 6:
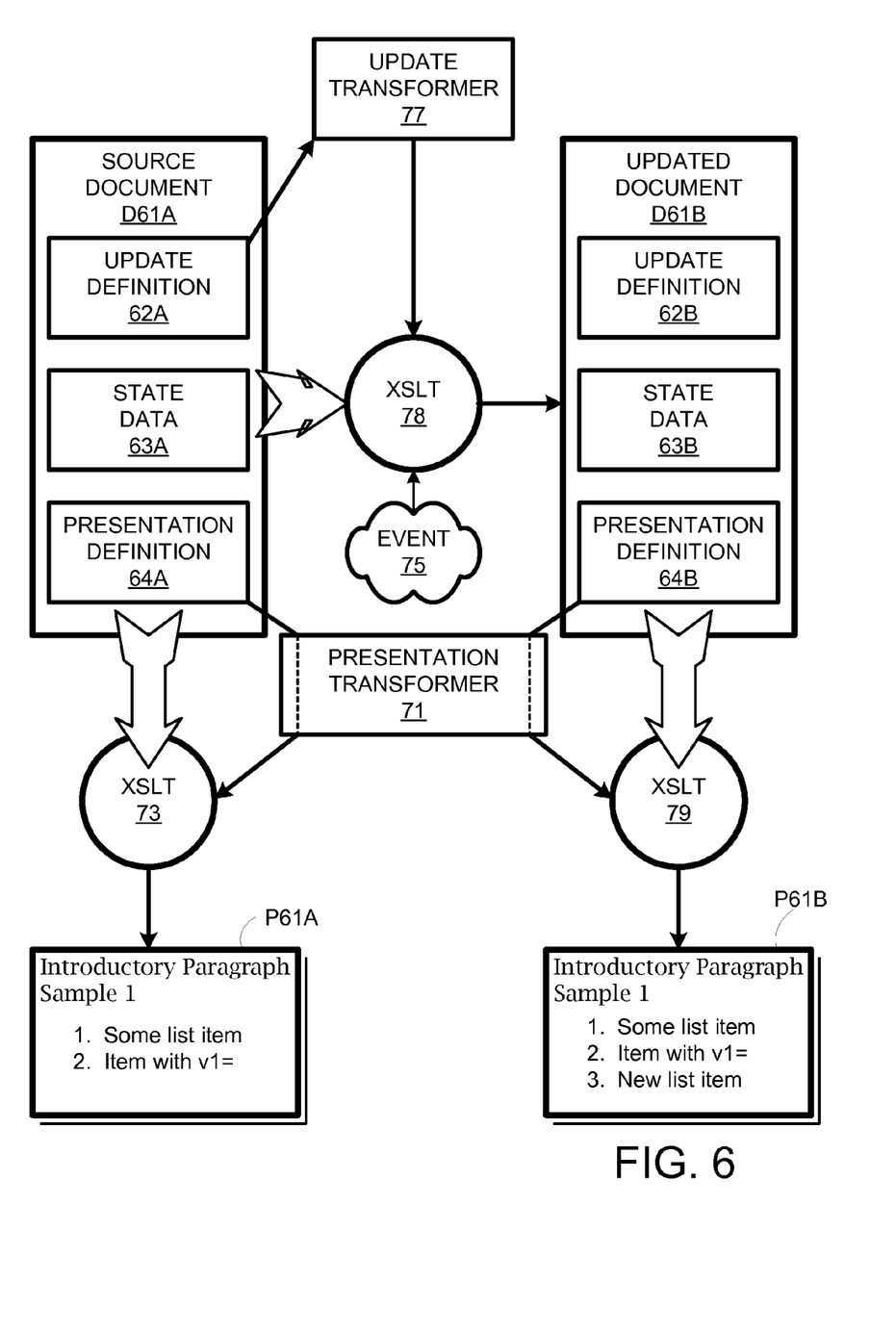
FIG. 6 is a transformation diagram for updating the document of FIG. 5.

An update of document D61 is represented in FIG. 6. A source version D61A is transformed to an updated version D61B. Source version D61A includes an update definition 62A, state data 63A, and a presentation definition 64A. A presentation P61A can be generated by a presentation transformer 71 using an XLST transform 73. In response to an event 75 (e.g., user interaction), an update transfer 77 can update version D61A using an XLST transform 78 to yield updated document D61B. Presentation transformer 71, using XLST transform 79, can generate a presentation P61B of version D61B. A comparison of presentations P61A and P61B demonstrates that a third item "3. New list item" has been added by the update.

The key is to build appropriate programs that will generate a presentation or an updated version of the document in question, modifying these programs in response to the declarations buried in those documents. Those declarations may contain programmatic elements in some canonical language.

The presentation definition is used to build an executable (an XSLT transform) that is then executed with the original source document as the principal argument, and characteristics of the device channel as additional parameters. This produces an output in some final format, and thence to a viewable image either through a client (e.g. a web browser) or a server where a grounded geometry form, such as PDF or an image, e.g., presentation P61A, is formed.

The presentation definition contains an XSL fragment, which interpolates the value of the document's title (attribute), but the variable interpolating element val, after the 'v1=', is not used (it's actually in the presentation but ignored by the web browser) as there is nothing that 'understands' that concept, nor the link to the variable representation. The styling of the rest of the document is set by HTML and browser defaults.

The document can be updated in response to some event. The source document may contain programmatic elements describing specific methods of update; for example, document version D61A responds to an addList event by adding a new item just after the last item of a list. Processing involves extracting the update definition from the document, converting it into an executable program and running it with the original document (e.g., document D61A) and the event (e.g., event 75) as principal arguments. The result can be an updated document, e.g., D61B, but it could equally well be some definition of a workflow of which a new value for the document is one component. Note that document version D61B is still able to respond to addList events, increasing the lists by one item per event.

Method ME1 uses dynamic, cascaded templating declarations attached to the documents; method ME1 implements with recursion of the basic approach to provide for such features as styling text elements, excluding or modifying certain types of elements, adding some common additional content, using variables as the declaration of a document-instance-specific state variable, interpolating its current value into a presentation (i.e. implement 'val', and updating such variables coherently across many documents.

Figure 7:
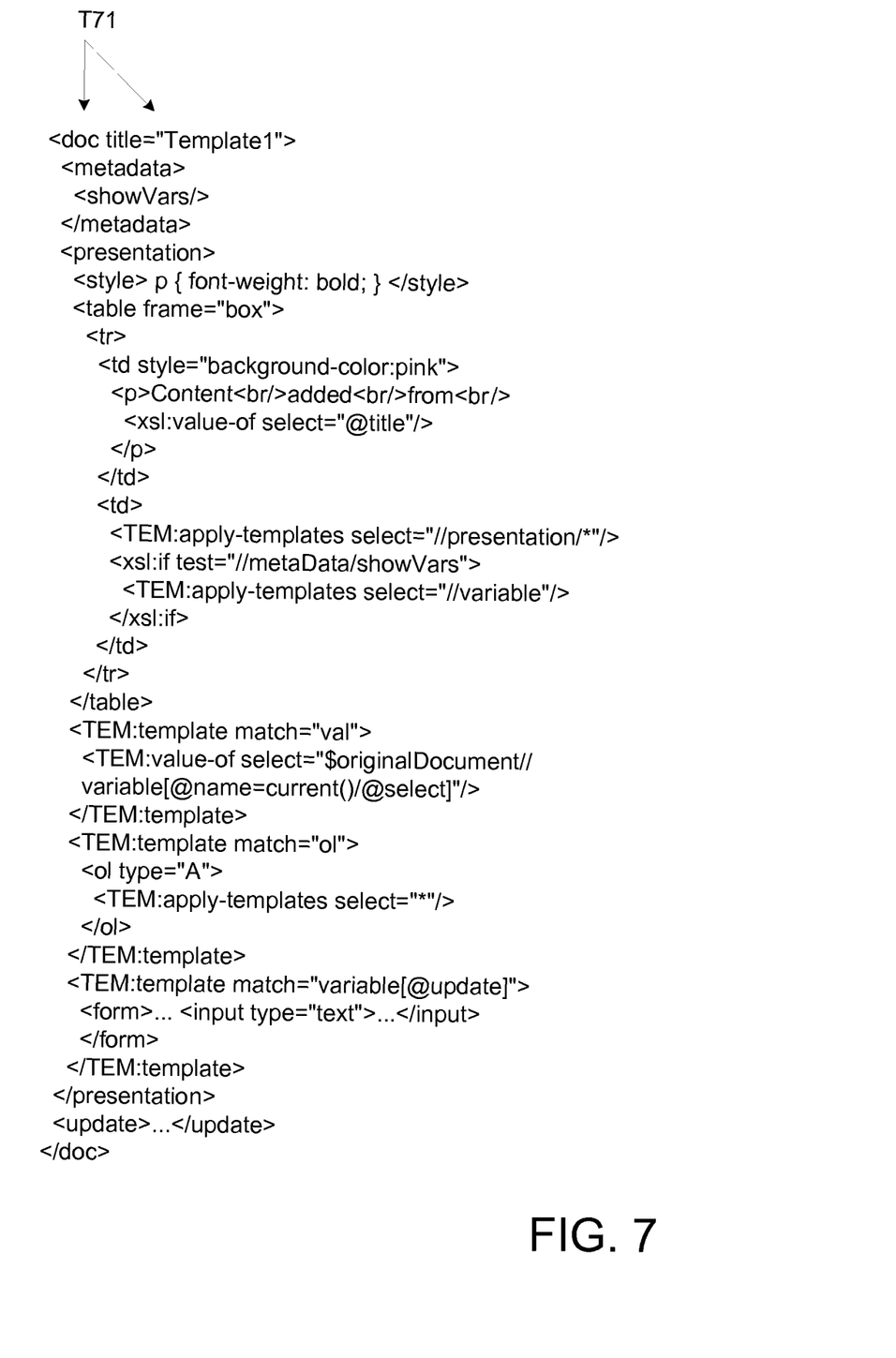
FIG. 7 represents a template document of the system of FIG. 1.
Figure 8:
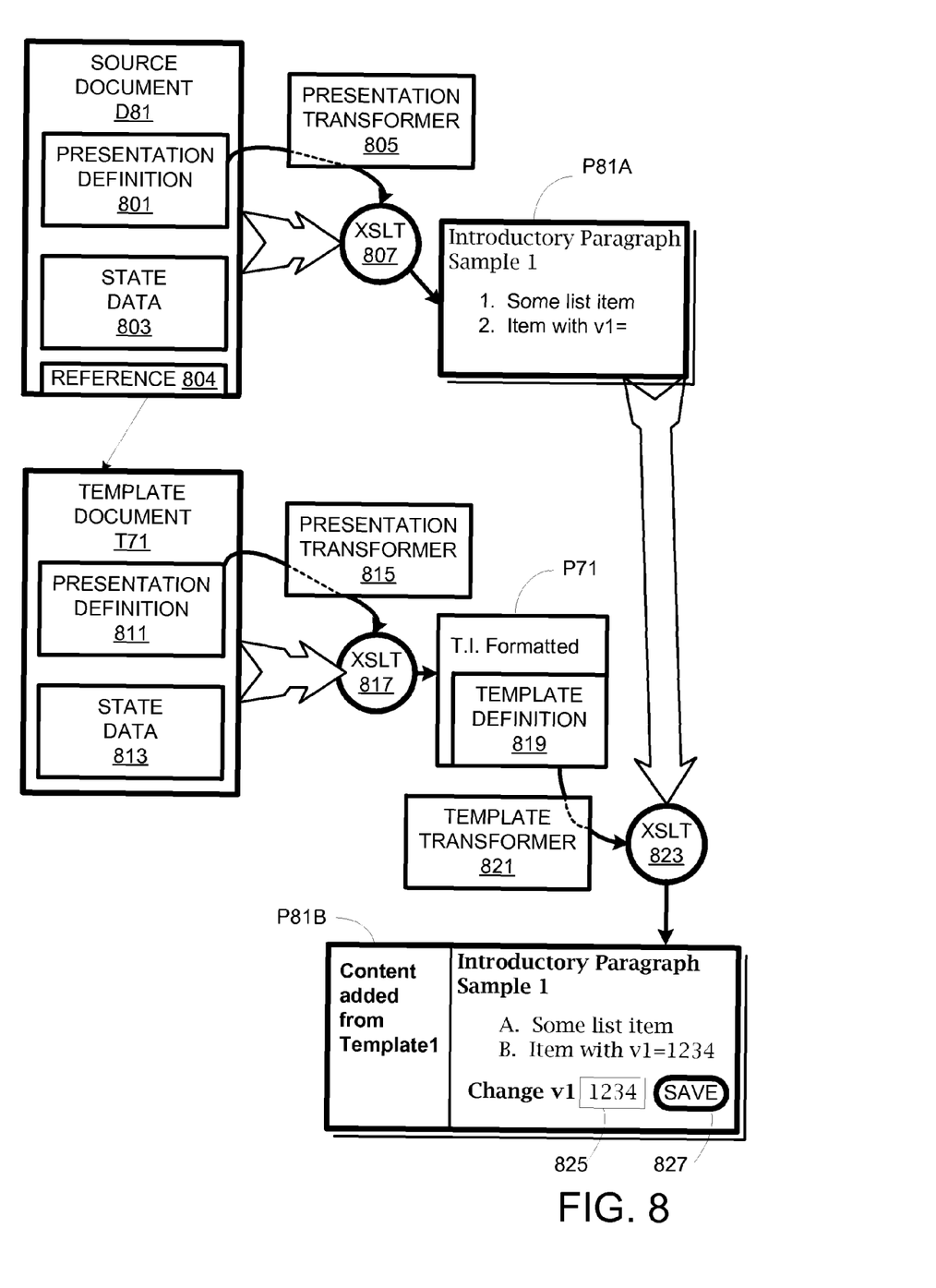
FIG. 8 is a transformation diagram for generating a presentation using the template document of FIG. 7.

For example, template document T71, FIGS. 7 and 8, provides for: a common style with some sidebar material, top-level paragraphs emboldened, alteration of the list numbering, variable values interpolated through the 'val' instruction and an input form for a variable marked as updateable, as shown in FIG. 8 at 801. Some of these (the emboldening and the styling of the list elements) could be handled by simple attachment of a CSS stylesheet, but the construction of the sidebar requires altering the document topology, e.g., surrounding the original content with a table cell; furthermore, the interpolation of the variable value requires some form of search of the document.

In FIG. 8, a source document D81 includes a presentation definition 801, state data 803, and a reference 804 to a template document T71 as a master template. A presentation transformer 805 generates an XLST transform 807, which yields intermediate presentation P81A. Template document T71 includes a presentation definition 811 and state data 813. A presentation transformer 815 using an XLST transform 817 yields a template presentation P71, including a template definition 819. A template transformer 821 using an XLST transform 823 generates from template presentation P71 final document presentation P81B. XLST transform 823 determines that "v1=1234" is an updateable variable and provided a change box 825 for modifying v1 and a "save button" 827" for saving the modification.

Method ME1 provides for attaching a template T71 (referred to as "Template1" by document D81) to document D81. Template T71 is still a document, but its presentation contains not only XSL programmatic fragments, but also additional elements in a separate namespace (prefixed TEM). The semantics of these are the same as those of the usual (XSL) presentational program, but they operate in a different phase and with a different source. Some of these are independent templates; others (apply-templates in this example) are instructions to interpolate the intermediate presentation into the result.

As the semantics are that of XSLT, considerable flexibility is available; for example variables within the display could be sorted by use of TEM:sort directives. These two spaces (XSL and TEM) can be intermingled and are executed in sequence.

The XSL operates with the templating document as source producing a result that may contain TEM components. In the example of FIG. 8, the existence of a metadata directive 'showVars' controls whether automatic variable display should be included. Template T71 contains presentation code that allows this directive to be deleted or inserted, enabling 'central' control of variable display. As the templates are consulted dynamically, this works for all documents exploiting this template.

A program is then constructed from that intermediate result, 'warping' TEM components into the XSLT namespace and then executed with the templated document's presentation result as source. (There are some additional parameters available—$originalDocument allows access to the source tree of the original document.)

Where a template refers to a further template, the process recurses, passing the accumulated final presentation as an argument. In this way, an application may use a set of branding templates that each depend upon some core 'behavioral template' which might implement a coherent state-variable system for all documents in the application. There is more information available; in particular, it is known at the point of generating a presentation as to whether this document is acting as a template for another document or is standalone; this could be exploited to generate different projections. For example, a branding template viewed 'standalone' could generate examples of the different styles it contains. If the programmatic definitions are functional (as in XLST), then we can merge elements from additional templates into the mixture.

Figure 9:
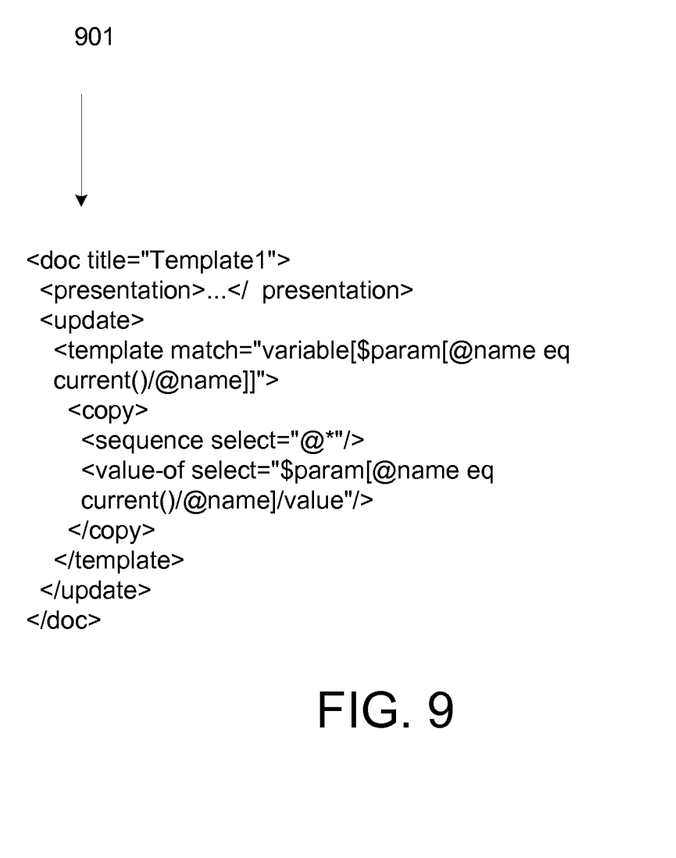
FIG. 9 represents a fragment of the template document of FIG. 7.

Method ME1 provides for different approaches to using templates in updating a document: 1) some similar recursively nested approach; and 2) a flat method where all the constructional elements from reachable templates are collected into a single program. Which is preferable depends upon whether the templates themselves are to alter their own state. In the examples above, the templates are considered invariant and only the state of the 'leaf' documents changes; in such cases, it is sufficient to collect all updating fragments through the template tree when forming the updating program. FIG. 9 shows an updating fragment 901 of the template T71. The component rewrites the value of a variable if an event parameter names that variable as a target.

The predicate in the template match ensures that only a suitably named variable is targeted. All template program fragments are considered to have similar priority. Alternatively, overloading and relative priority can be provided for. In the alternative approach, suitable when the templates have their own mutable state, and the result of the update is a 'workflow', the result of one stage can be taken as an input to the next templating stage, building up a composite workflow that may eventually end up modifying several documents. This also allows deeper templates overriding decisions taken closer to the document instance.

The same template definition chain can be used for document updating as well as for presentation in that a deeper template can co-describe both presentational and state-changing behavior. The illustrated example uses settable document-borne variables, but the underlying system (including the system transformers) has no knowledge of the existence of such variables, nor how they are represented. This is entirely described in the lowest-level templates, i.e., how to process updates and how to interpolate values into presentations (strictly, how to generate the correct presentation for an agreed interpolating instruction).

Method ME1 provides for adding vector and structured variables into its documents, and adding a full transclusion support system as a single low-level template document, both without alteration to the underlying platform. Method ME1 exploits functional programming properties and with a novel dynamic system of inheritance.

By using XML-based techniques with reserved namespaces, attribute decorations, and XLST functionality, system AP1 provides for "agreement" between platform and document representation on: discovery, syntax and semantics of document-embedded program fragments for presentation and update canonical description of additional parameters for updating and presentation programs, events for update, device characteristics and 'roles' for presentation.

Variations on methods ME0-ME4 provide for more or fewer presentation documents, as well as different methods that can generate buttons and other active (behavioral) and passive elements. As indicated above, different types of document hierarchies can be accommodated. These and other variations upon and modifications to the illustrated embodiments are within the scope of the following claims.

What is claimed is:

1. A document-handling method comprising:
   determining whether or not a top-level document refers to a second document as a template;
   if not, executing a first method specified by said top-level document to yield a final presentation; and
   if so,
     executing said first method specified by said top-level document to yield a first presentation, and
     executing a second method specified by said second document using said first presentation as an argument for said second method.

2. A method as recited in claim 1 further comprising:
   determining whether or not said second document refers to a third document as a template; and
   if not, executing a second method specified by said second document to yield a final presentation; and
   if so, executing said second method to yield an intermediate second presentation.

3. A method as recited in claim 1 further comprising iteratively performing the following series of steps starting with N=2 and incrementing N each iteration until one of said documents is updated:
   determining whether or not an Nth document refers to an (N+1)st document as a template; and
   if so, executing said Nth method to yield an intermediate Nth presentation, and returning to said determining for the next iteration; and
   if not, executing an Nth method specified by said Nth document so that at least one of said documents is updated.

4. A method as recited in claim 1 further comprising iteratively performing the following series of steps starting with N=2 and incrementing N each iteration until a final presentation is obtained:
   determining whether or not an Nth document refers to an (N+1)st document as a template; and
   if so, executing said Nth method to yield an intermediate Nth presentation, and returning to said determining for the next iteration; and
   if not, executing an Nth method specified by said Nth document to yield a final presentation.

5. A method as recited in claim 4 wherein each said intermediate Nth presentations is an argument for an (N+1)st method associated with a respective (N+1)st document.

6. A method as recited in claim 5 wherein said (N+1)st method evaluates a variable present in said Nth presentation.

7. A method as recited in claim 4 further comprising displaying said final presentation but not any intermediate presentation.

8. A method as recited in claim 6 wherein said one of said methods adds or modifies a behavioral element to a presentation input to that method as an argument.

9. A method as recited in claim 6 wherein at least one of said methods conditions an action based on whether or not a presentation serving as an argument to that method includes a specified first behavior element.

10. A method as recited in claim 9 wherein that method generates a presentation that includes a second behavioral element that must be activated before said first behavioral element is activated.

11. A system comprising non-transitory computer-readable media encoded with code, said code defining documents, presentations corresponding to said documents, and a document handler for generating said presentations from said documents, said document handler providing for executing a (N+1)st method specified by an (N+1)st document so as to generate an (N+1)st presentation, wherein said (N+1)st method accepts as an argument an Nth presentation generated by an Nth method specified by an Nth document that refers to said (N+1)st document as a template, where N is an iteration index.

12. A system as recited in claim 11 further comprising one or more processors for executing code associated with said document handler.

13. A system as recited in claim 11 wherein said document handler provides for displaying a presentation generated by a method specified by a document that does not refer to another document as a template.

14. A system as recited in claim 13 wherein said document handler provides for not displaying presentations generated by methods specified by documents that do refer to other documents as templates.

15. A system as recited in claim 13 wherein plural documents refer to the same document as a template.

16. A system as recited in claim 11 wherein one of said methods updates one of said documents.

\* \* \* \* \*